United States Patent
Schmitt et al.

(10) Patent No.: US 12,447,883 B2
(45) Date of Patent: Oct. 21, 2025

(54) VEHICLE EQUIPMENT COMPONENT

(71) Applicant: GRAMMER AG, Ursensollen (DE)

(72) Inventors: Sebastian Schmitt, Nuremberg (DE);
Kadir Yasaroglu, Philippsburg (DE);
Niranjan Patankar, Jalagon (IN)

(73) Assignee: GRAMMER AG, Ursensollen (DE)

( * ) Notice: Subject to any disclaimer, the term of this patent is extended or adjusted under 35 U.S.C. 154(b) by 327 days.

(21) Appl. No.: 17/987,124

(22) Filed: Nov. 15, 2022

(65) Prior Publication Data

US 2023/0173965 A1    Jun. 8, 2023

(30) Foreign Application Priority Data

Nov. 18, 2021    (DE) .............. 10 2021 130 160.2

(51) Int. Cl.
*B60N 2/865*    (2018.01)
(52) U.S. Cl.
CPC ................... *B60N 2/865* (2018.02)
(58) Field of Classification Search
CPC .......... B60N 2/80; B60N 2/812; B60N 2/815; B60N 2/865
USPC .......................................... 70/261
See application file for complete search history.

(56) References Cited

U.S. PATENT DOCUMENTS

| | | | |
|---|---|---|---|
| 8,814,227 B2 * | 8/2014 | Wallinger | B60N 2/919 292/200 |
| 8,814,272 B2 * | 8/2014 | Poehlmann | B60N 2/818 297/410 |
| 9,085,253 B2 * | 7/2015 | Delling | B60N 2/865 |
| 9,555,727 B2 * | 1/2017 | Kotz | B60N 2/888 |
| 11,247,594 B2 | 2/2022 | Morilhat | |
| 2015/0352989 A1 * | 12/2015 | Ishihara | B60N 2/818 297/406 |
| 2020/0247294 A1 * | 8/2020 | Kang | B60N 2/427 |
| 2021/0245639 A1 * | 8/2021 | Morilhat | B60N 2/821 |

FOREIGN PATENT DOCUMENTS

| | | |
|---|---|---|
| CN | 109795389 A | 5/2019 |
| CN | 211493763 U | 9/2020 |
| CN | 112351910 A | 2/2021 |
| DE | 102010055381 A1 | 6/2012 |
| DE | 102013010705 A1 * | 10/2014 ............. B60N 2/865 |

OTHER PUBLICATIONS

Chinese Search Report for Application No. 202211443370.3 Dated Feb. 8, 2025, 1 Page.

* cited by examiner

*Primary Examiner* — Nathan Cumar
(74) *Attorney, Agent, or Firm* — LUCAS & MERCANTI, LLP; Klaus P. Stoffel

(57) ABSTRACT

An equipment part for a vehicle, having a base and a part that is movable relative to the base, wherein the movable part is lockable with respect to at least one movement direction in at least two positions relative to the base by a locking device. The locking device includes at least one recess, wherein in a catch position of the locking device at least one safety catch engages into one of the recesses and in a release position the safety catch is out of engagement with the recess. The safety catch has at least one latch surface which cooperates with a first holding surface of the recess, and at least one comfort catch of the locking device has a second catch surface which cooperates with a second holding surface of the recess, wherein the second catch surface is inclined relative to the first catch surface.

14 Claims, 8 Drawing Sheets

VEHICLE EQUIPMENT COMPONENT

CROSS-REFERENCE TO RELATED APPLICATIONS

The present application which claims priority of DE 10 2021 130 160.2, filed Nov. 18, 2021, the priority of the application is hereby claimed and this application is incorporated herein by reference.

BACKGROUND OF THE INVENTION

The invention relates to a vehicle equipment part having a base part and a part that is movable relative to the base part. The movable part is lockable relative to the base in at least one position by means of a locking device.

For example, the vehicle equipment part is formed by a headrest. There is known from public prior use a headrest having a base mounted on a holding device and having a head-contact part which is movable in the x-direction relative to the head of the occupant of the seat and in the opposite direction, which head-contact part forms the movable part that is mounted so as to be movable relative to the base.

The movable part is lockable in a plurality of positions by means of a locking device. The locking device has a plurality of catch structures formed on the head-contact part, which catch structures cooperate with a movable catch. The catch is movable between a catch position and a release position. In the catch position, the catch is in engagement with a catch structure, and in the release position, the catch is out of engagement with the catch structure.

The catch must have sufficient clearance in relation to the catch structure, so that movement between the catch position and the release position is possible. It is a disadvantage that the clearance between the catch and the head-contact part leads to undesirable noise.

SUMMARY OF THE INVENTION

The object of the invention was to provide an equipment part which avoids clearance between the catch and the movable part in the catch position.

The equipment part is intended for a vehicle. Vehicle in this context is a land vehicle, an aircraft or a water-craft. The equipment part comprises a base and a part that is movable relative to the base. The movable part is movable, for example, in translation or in rotation or has a mixed movement comprising translational and rotational components.

The movable part is lockable in at least one position relative to the base by means of a locking device. Within the meaning of the invention, "is lockable" means that the movable part is not movable in at least one movement direction in a catch position of the locking device.

The locking device is movable between a catch position and a release position. In the catch position, movement of the movable part in at least one direction is not possible. That is to say, movement is not possible only in respect of one movement direction or in respect of two opposite movement directions.

The locking device comprises at least one catch structure in the form of a recess, wherein in a catch position of the locking device at least one catch engages into the recess and in a release position the catch is out of engagement with the recess.

According to the invention, the locking device has a safety catch having at least a first catch surface which cooperates with a first holding surface of the recess, and at least one comfort catch having a second catch surface which cooperates with a second holding surface of the recess. The second catch surface is inclined relative to the first catch surface.

Because the second holding surface is inclined relative to the first holding surface, the catch can be moved into the recess until it both abuts the first catch and is in contact with the second holding surface. Clearance can thus be eliminated completely.

The inclination is, for example, such that the cooperating surfaces of the comfort catch and of the movable part are outside of self-locking. It is then possible, for example, first to move the second catch from a primary position into a secondary position in order to move the comfort catch out of engagement with the second holding surface. The safety catch, which is then no longer loaded by the comfort catch against the first holding surface, can then be moved out of the recess.

At least one of the holding surfaces extends, for example, approximately at a right angle to the movement direction of the movable part. If the safety catch has a catch surface which extends approximately parallel thereto, movement in one of the movement directions can securely be locked when that surface cooperates with the catch. No forces which move the catch in the release direction then act, for example, in the case where the movable part is loaded in the movement direction x2.

Preferably, the holding surface oriented toward the applied force is formed approximately at a right angle to the movement direction of the movable part.

When an inclined catch surface cooperates with a holding surface of the recess, forces resulting from forces caused by the movable element can load the catch out of engagement with the recess. Unintentional unlocking, for example, can be prevented by means of a blocking element which prevents a movement of the catch in the release direction.

The first catch surface is arranged, for example, opposite the second catch surface. In this manner, movement of the movable part in two opposite directions can be prevented.

The first holding surface and/or the second holding surface extends approximately at a right angle to the movement direction of the movable part. When the catch surface cooperating with the respective holding surface extends parallel to the holding surface, no forces that load the catch out of engagement with the recess can occur.

For example, the safety catch has at least a first catch surface parallel to the first holding surface. When, in the case of a force acting on the movable part, the first holding surface is formed parallel to the first catch surface, the safety slide is not loaded in the release direction.

For example, the second holding surface is inclined relative to the first holding surface. The inclination is, for example, such that the recess opens for easier insertion of the comfort catch.

At least one of the catches among safety catch and comfort catch is in the form of, for example, a slide. In particular, both catches are in the form of a slide. Each slide is mounted so as to be movable in translation. At least one slide is mounted, for example, on the base. Guiding is less complex in this case. Moreover, the space requirement of a slide is low. By means of the slide, high catch forces can be transmitted.

Alternatively, at least one catch could, however, also be rotatably mounted or mounted in such a way that it carries out a mixed movement with translational and rotational components.

The safety catch and the comfort catch are, for example, mounted so as to be movable relative to one another. In this manner, one catch—at least in a limited movement range—can be moved out of engagement with the holding surface independently of the other catch.

For example, one catch among safety catch and comfort catch is mounted on the other catch. In particular, the comfort catch is mounted on the safety catch. A compact structural form can be achieved with this embodiment.

One catch among safety catch and comfort catch has, for example, a first stop surface and a second stop surface, wherein the end positions of the other catch are limited by the stop surfaces. One catch can then be guided on the other catch with limited freedom of movement.

For example, one catch among safety catch and comfort catch has carrier elements. It is then possible that, when one catch is moved, the other catch is carried along. Carrying along can take place in an offset manner, so that one catch travels a certain distance relative to the other catch before the other catch is carried along.

The safety catch and the comfort catch are, for example, guided on the base. In this manner, high forces acting on the catch can be absorbed directly or indirectly by the base.

The safety catch is, for example, loaded by a spring into the catch position in engagement with the first holding surface. The catch position of the locking device is thus restored automatically when the safety catch has been moved into the release position.

The comfort catch is, for example, loaded into engagement with the second holding surface by a comfort spring, or alternatively the comfort catch is loaded into a specific position relative to the safety catch. When the comfort catch, for example, has a separate guide independent of the safety catch, the spring can load the comfort catch into engagement with the second holding surface. If the comfort catch, for example, is guided on the safety catch, it can be loaded into a specific position relative to the safety catch. This position can be, for example, an end position in which the comfort catch abuts the safety catch.

The safety catch and/or the comfort catch is movable between two positions by means of an actuating device. For example, the actuating device moves the two catches separately. Alternatively, one of the catches is moved, for example, by the actuating device in the event of actuation, and that catch takes the other catch with it after a certain distance. For example, the comfort catch is first moved out of engagement with the second holding surface and then the safety catch is moved into the release position. In this case, the movement of the safety catch can be carried out more easily because it is not loaded in contact with the first holding surface by the comfort catch.

An exemplary embodiment of the invention is described by way of example in the following description of the Figures, also with reference to the schematic drawings. In the drawings, for the sake of clarity—also where different exemplary embodiments are concerned—identical or comparable parts or elements or regions are designated with identical reference characters, in some cases with the addition of lowercase letters.

Features which are described, shown or disclosed only in relation to one exemplary embodiment can also be provided within the scope of the invention in any other exemplary embodiment of the invention. Such modified exemplary embodiments—even if they are not shown in the drawings—are included in the invention.

All the disclosed features are in themselves essential to the invention. The disclosed content of the cited publications and of the described devices of the prior art is hereby also incorporated in its entirety into the disclosure of the application, also for the purpose of incorporating individual or multiple features of the subject-matter disclosed therein into one claim or into a plurality of claims of the present application. Such modified exemplary embodiments—even if they are not shown in the drawings—are also included in the invention.

BRIEF DESCRIPTION OF THE DRAWING

Shown are in.

DETAILED DESCRIPTION OF THE INVENTION

Figure 1:
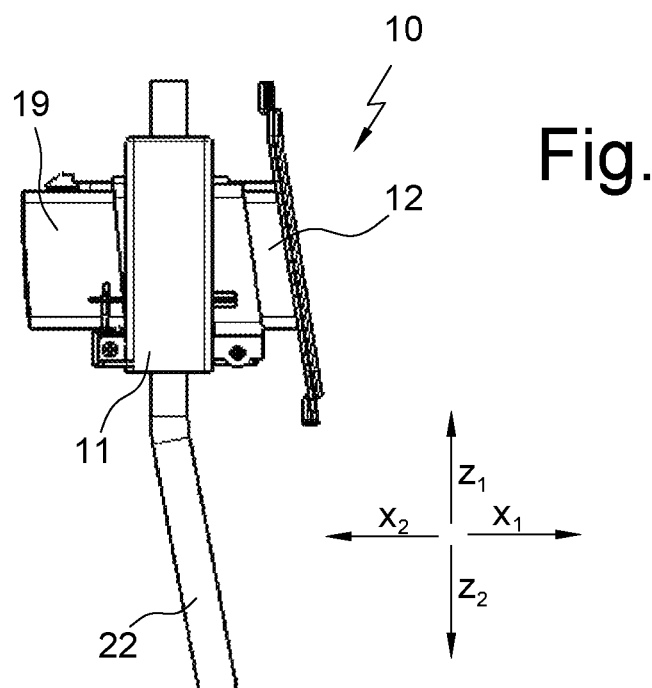
FIG. 1 a side view of an equipment part according to the invention in the form of a headrest having a head-contact part, FIG. 2 a perspective longitudinal sectional view of the headrest, wherein the head-contact part is arranged in a first position and a locking device for the head-contact part is arranged in a release position, FIG. 3 a longitudinal sectional view of the headrest, wherein the head-contact part is arranged in a first position and a locking device for the head-contact part is arranged in a catch position, FIG. 4 a longitudinal sectional view based on FIG. 2, wherein a locking device is arranged in a release position, FIG. 5 a longitudinal sectional view of the headrest, wherein the head-contact part is arranged in a second position and the locking device is arranged in the release position, FIG. 6 a longitudinal sectional view based on FIG. 5, wherein the locking device is arranged in a catch position, FIG. 7 a perspective view of a catch assembly, comprising a safety catch and a comfort catch, FIG. 8 a side view of the catch assembly, FIG. 9 a rear view of a region of the headrest, wherein an actuating device is arranged in an unactuated position.

An equipment part as a whole is designated with reference character 10 in the figures. In the present exemplary embodiment, the equipment part 10 is a headrest.

Figure 2:
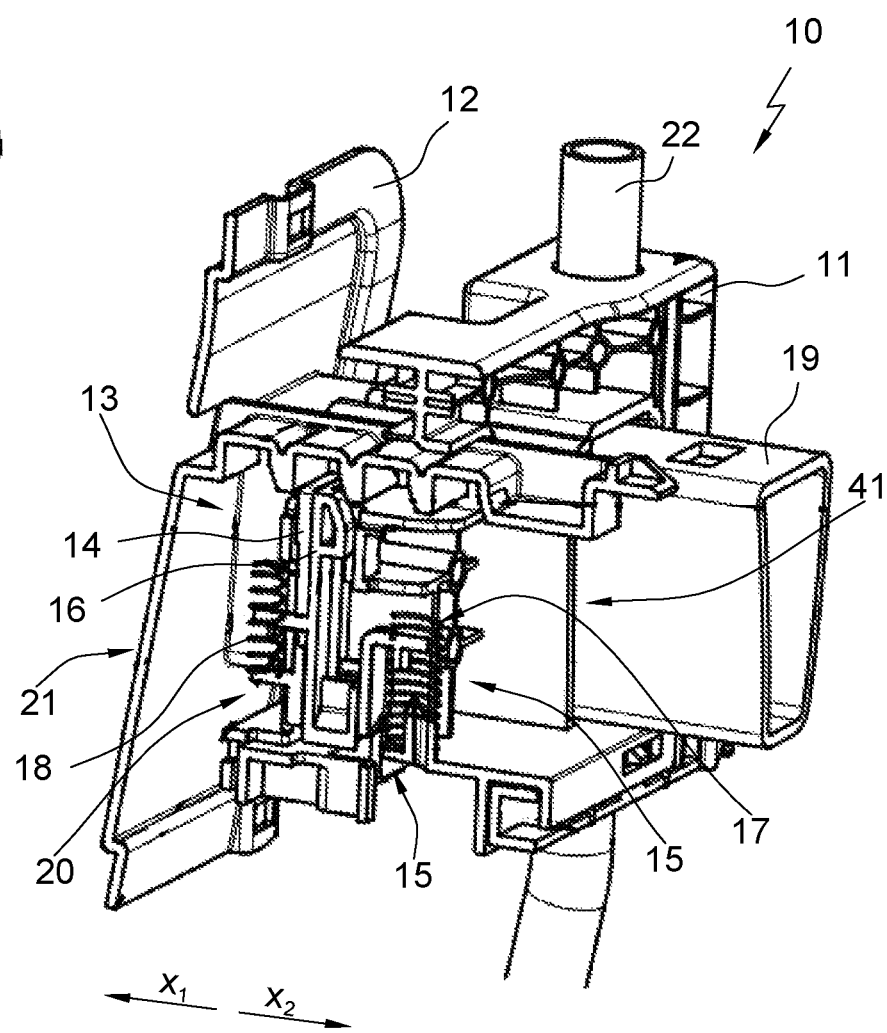

The equipment part 10 comprises according to FIGS. 1 and 2 a base 11 and a part 12 that is movable relative to the base 11. In this case, the movable part is a head-contact device which has a head-contact surface 21 and is movable in direction x1 and x2 relative to the base 11. The base 11 is held on a holding device 22.

Figure 3:
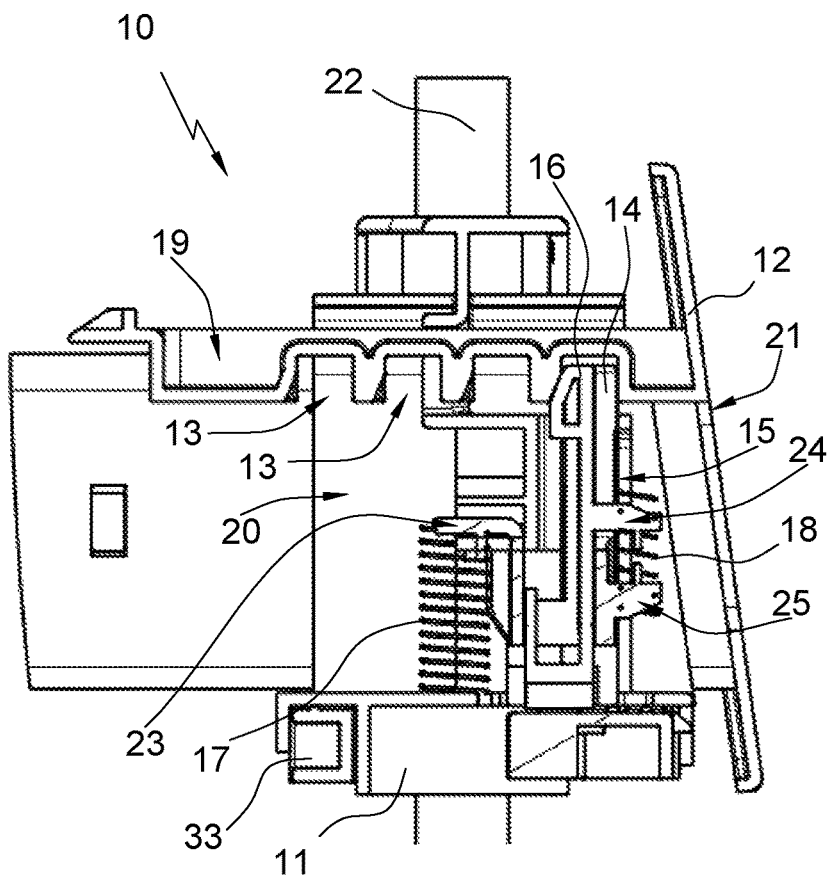
Figure 4:
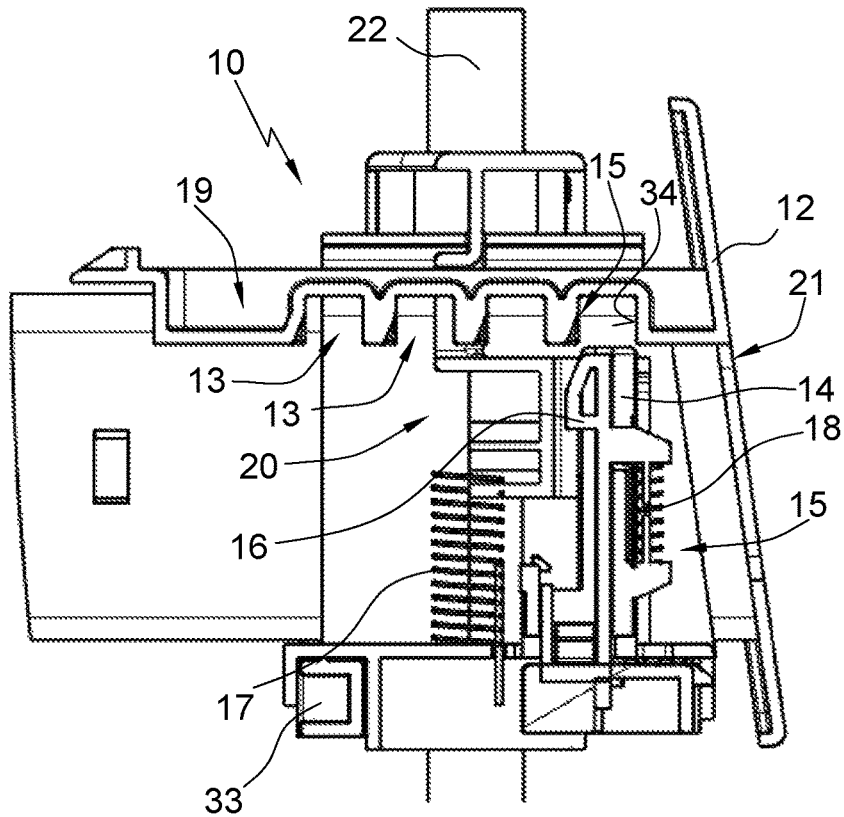
Figure 5:
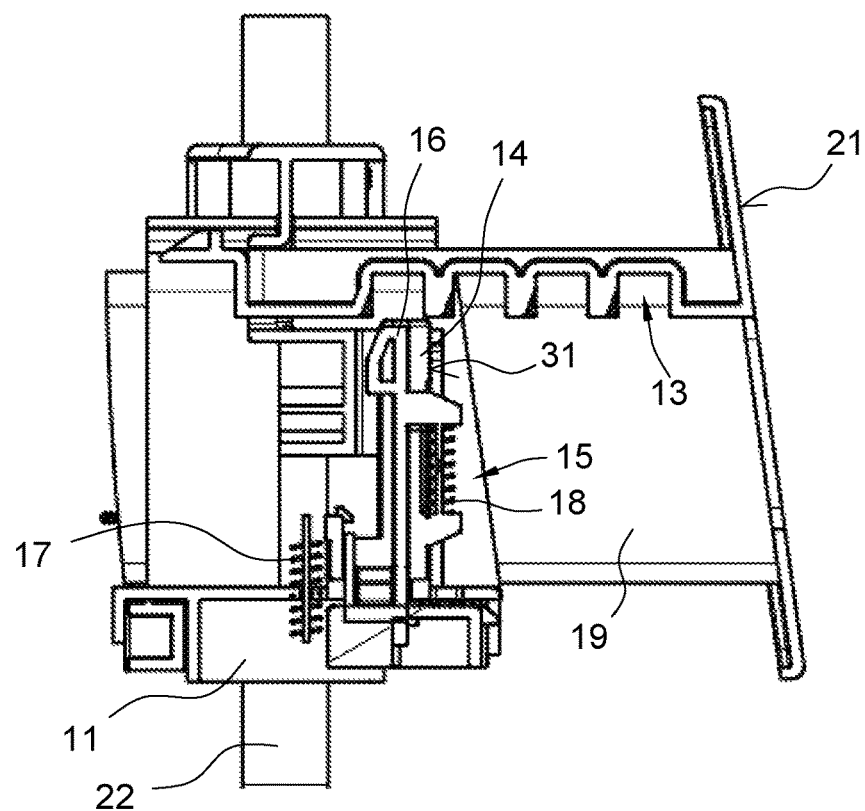
Figure 6:
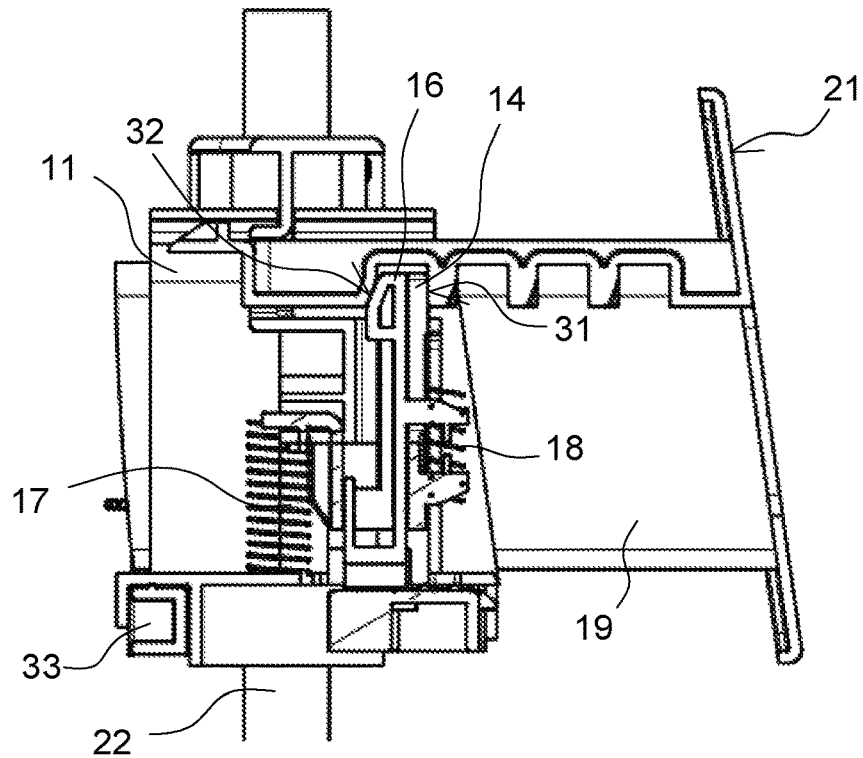

The movable part 12 is movable between a first position, which is shown in FIGS. 3 and 4, and a second position shown in FIGS. 5 and 6.

According to FIGS. 3 to 6, the equipment part 10 comprises a locking device 20. The locking device 20 comprises a plurality of recesses 13 which are arranged one behind the other in the movement direction x1 and x2 in such a way that the movable part 12 is lockable in a plurality of positions on its movement path. In the present exemplary embodiment, the movable part 12 is lockable in the first position, the second position, and in a plurality of intermediate positions between the first position and the second position.

The recesses are arranged on a projection 19 which extends in direction x2 relative to a head-contact surface 21 of the movable part 12. Each of the recesses 13 has a first holding surface 34 parallel to the movement directions z1 and z2 and a second holding surface 35 which is opposite the first holding surface 34 and is inclined relative to the movement directions z1 and z2.

The locking device 20 further comprises a catch assembly 15 which has a safety catch 14 and a comfort catch 16. The safety catch 14 prevents, in respect of directions x1 and x2, the movable part 12 from unintentionally moving out of the set position in direction x1 or x2. The comfort catch 16 prevents clearance between the movable part 12 and the safety catch and thus clearance between the movable part 12 and the base 11.

The safety catch 14 is in the form of a slide and is movable in directions z1 and z2 in a guide (not shown in detail) of the base 11 between a catch position and a release position. The comfort catch 16 is in the form of a carriage and is mounted on a guide track formed on the safety catch 14. The comfort catch 16 is movable in directions z1 and z2 relative to the safety catch 14 between a primary position and a secondary position. The primary position is shown, for example, in FIG. 3 and the secondary position is shown in FIG. 4.

A safety spring 17 (see FIGS. 7 and 8) loads the safety catch 14 in direction z1 into the catch position, that is to say into engagement with one of the recesses 13. The safety catch 14 is thus automatically moved into the catch position. The safety spring 17 bears against the base 11 and against an arm 23 of the safety catch 14.

A comfort spring 18 loads the comfort catch 16 into the primary position. The comfort spring 18 bears against the safety catch 14 and against the comfort catch 16. For this purpose, the comfort catch 16 has an arm 24 and the safety slide has an arm 25, wherein the comfort spring 18 is in contact with the arms 24 and 25 and loads them in opposite directions z1 and z2.

Figure 7:
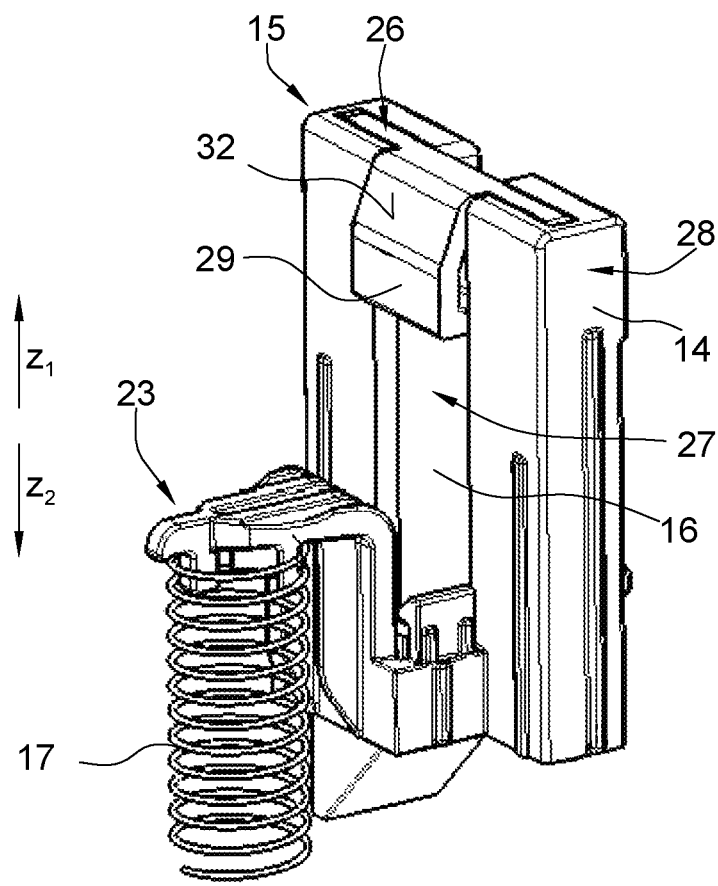

It can be seen in FIG. 7 that the comfort catch 16 is guided in a sliding manner on the safety catch 14. In the present example, the safety catch 14 has a guide groove 26 in which the plate-shaped comfort catch 16 is guided in the manner of a drawer so as to be movable in directions z1 and z2.

Figure 8:
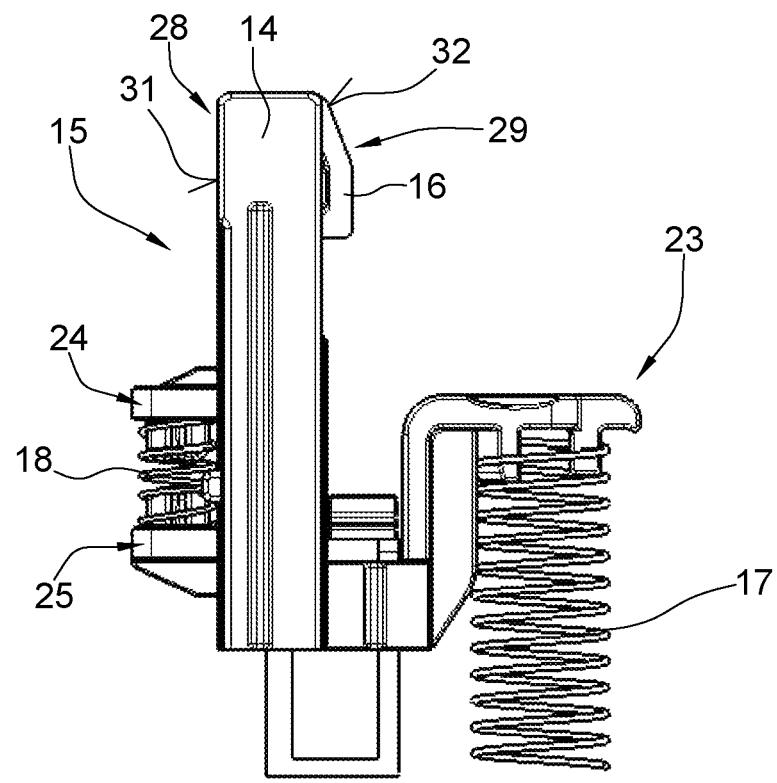

It can be seen in FIGS. 7 and 8 that the safety catch 14 has a catch region 28 and the comfort catch 16 has a catch region 29. The safety catch 14 is provided with a recess 27 in which the catch region 29, which projects with respect to an outer surface of the safety catch 14, is displaceable. While the safety catch 14 forms a first catch surface 31 which is approximately parallel to the movement directions z1 and z2, there is formed on the catch region 29 a second catch surface 32 which is inclined relative to the first catch surface 31. The inclination is such that the catch region 29 widens in the movement direction z1 of the comfort catch 16 at a right angle to the Z-axis.

The first catch surface 31 of the catch 14 cooperates with the first holding surface 34, and the second catch surface 32 of the catch 16 cooperates with the second holding surface 35.

Figure 9:
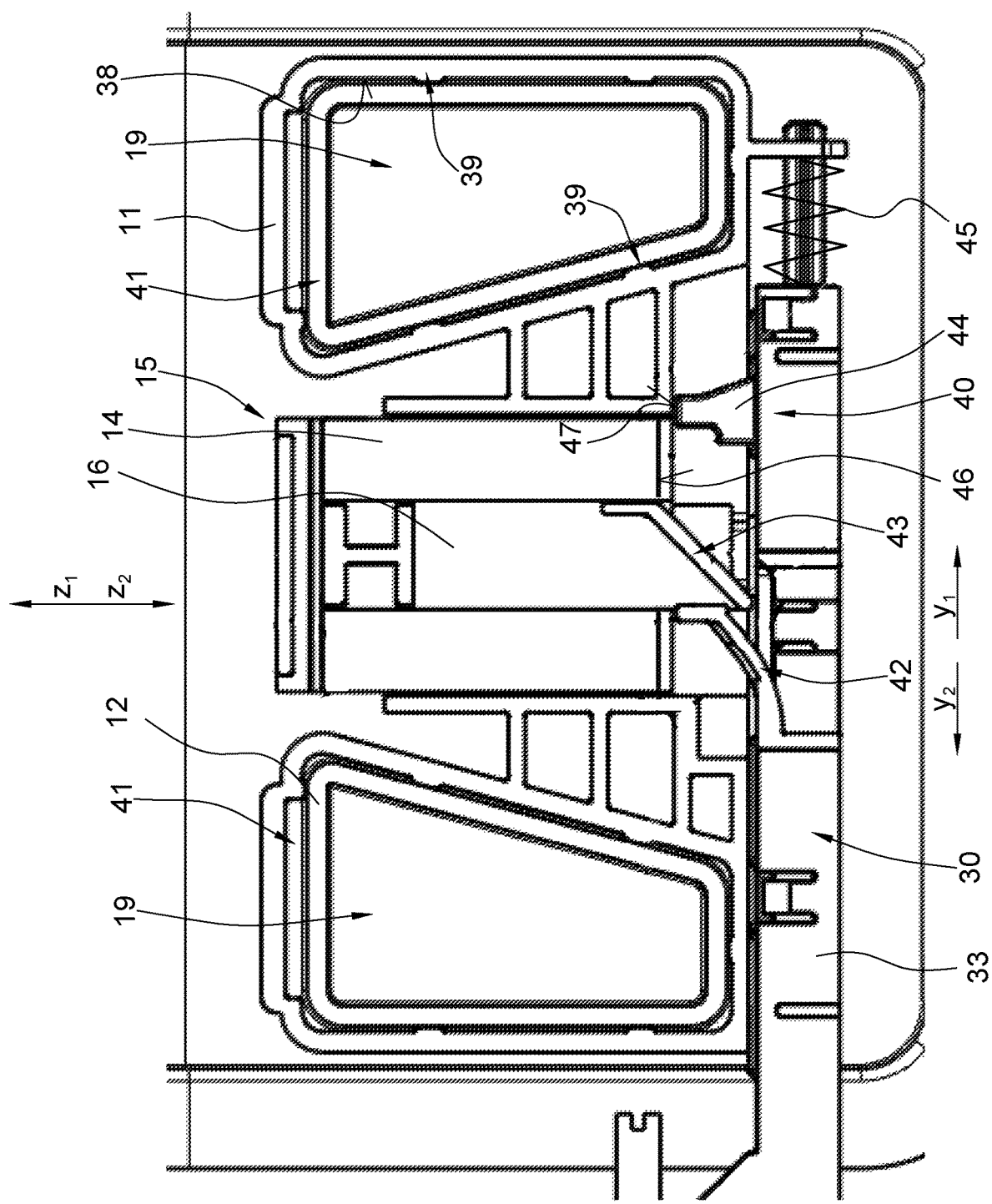
Figure 10:
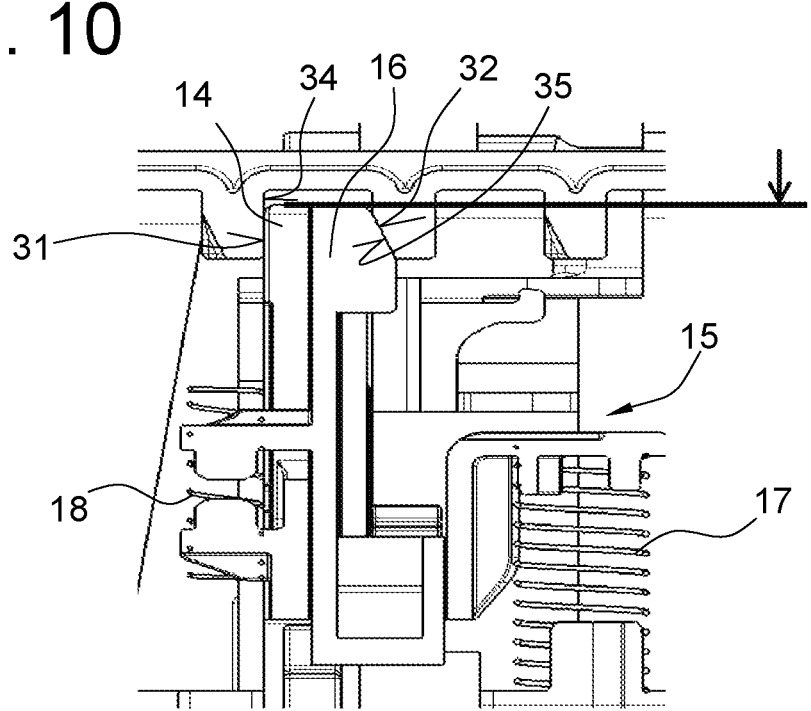
FIG. 10 is a sectional view of the catch assembly in the unactuated position, wherein the safety catch is arranged in the catch position and a comfort catch is arranged in the primary position.
Figure 11:
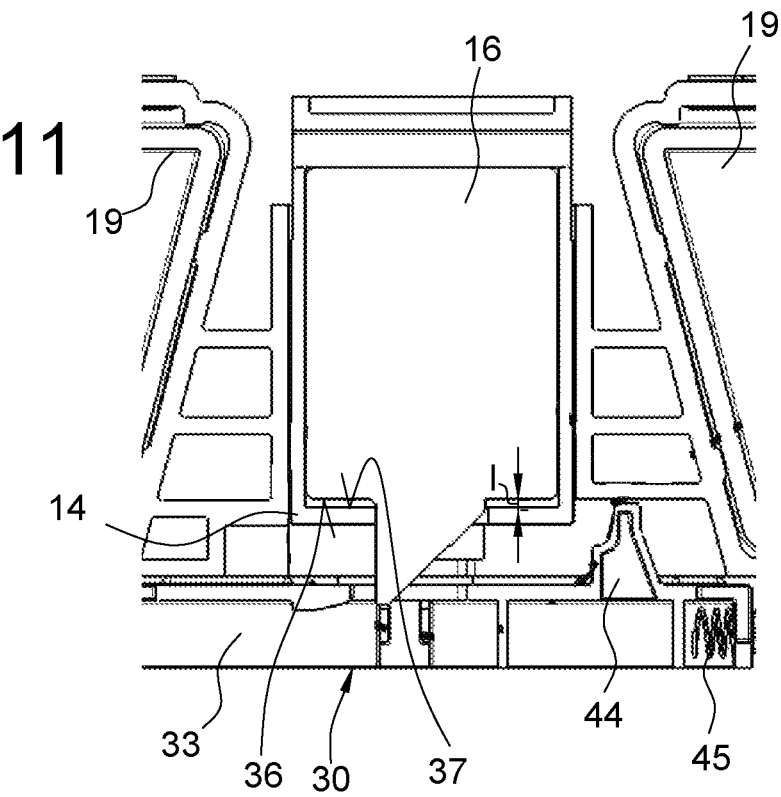
FIG. 11 is a sectional view of the safety catch and of the comfort catch in the position according to FIG. 10.

In the locked position according to FIGS. 9 to 11, the first holding surface 34 is in contact with the first catch surface 31. In addition, the second holding surface 35 is in contact with the second catch surface 32. Because the second catch surface 32 is loaded by the comfort spring 18 against the second catch surface 35, there is no clearance formed between the safety catch 13, the comfort catch 14 and the recess 13.

In FIG. 9, a rear view of the equipment part 10 is shown. It can be seen that two projections 19 of the movable part 12 are guided in recesses 41 of the base 11. In order to avoid high frictional resistance, protrusions 39 are formed on a guide surface 38.

Furthermore, the locking device 20 has according to FIG. 10 an actuating device 30. The actuating device 30 comprises an actuating part 33 which is guided on the base 11 so as to be movable in directions y1 and y2 between an unactuated position and an actuated position. The actuating part 33 is loaded into the unactuated position by a spring 45. The actuating part 33 comprises an actuating lug 42 which cooperates with a ramp element 43, which is in the form of a plane that is inclined relative to the movement directions, in order to move the comfort catch 16 into the freeing position and the safety catch 14 into the release position.

Figure 12:
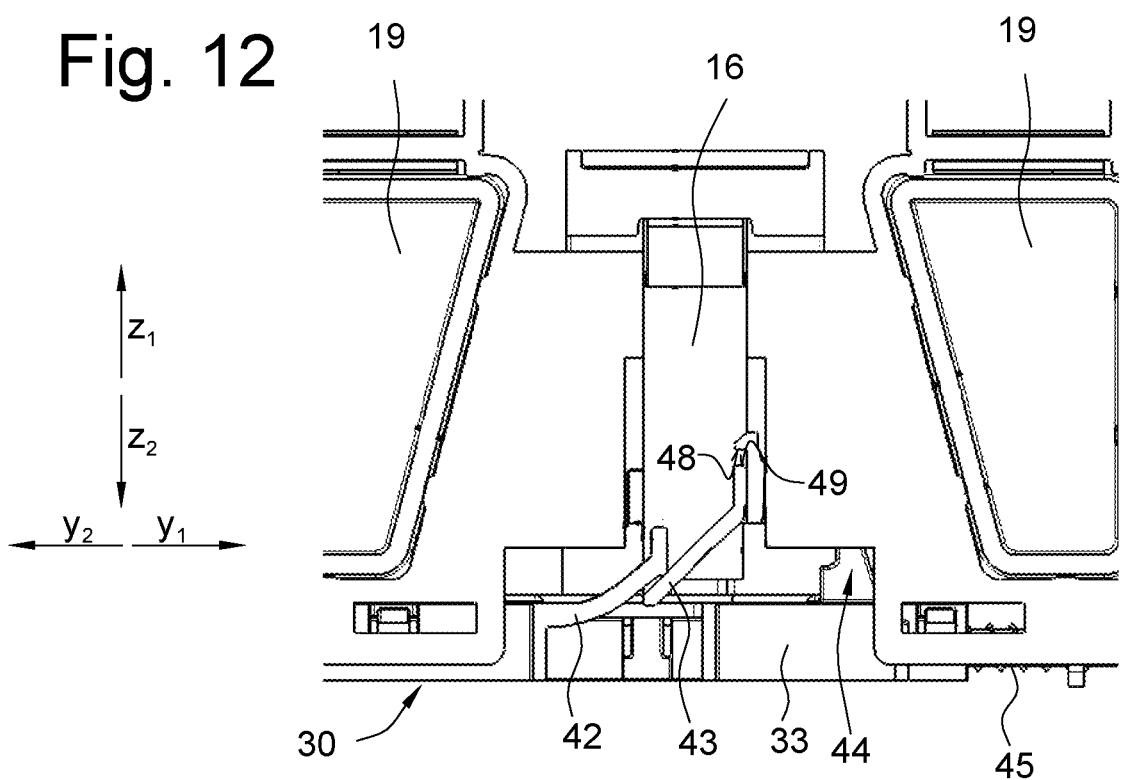
FIG. 12 is a rear view based on FIG. 9, wherein an actuating device is in a partially actuated position.

According to FIG. 12, a stop surface 36 of the comfort catch 16 is at a distance I from a base surface 37 of the safety catch 14. The comfort catch 16 is therefore able to move in direction z2 relative to the safety catch 14.

A further stop surface 49 of the safety catch 14 cooperates with a stop surface 48 of the comfort catch 16 and defines the first position of the comfort catch 16 (see FIG. 12).

The actuating part 33 comprises a blocking element 44, which is part of a safety device 40. The blocking element 44 prevents the safety catch 14—for example owing to inertia forces—from unintentionally moving against the force of the safety spring 17 into the release position. The blocking element 44 cooperates with a bottom surface 46 of the safety catch 14.

In the unactuated position of the actuating device 30 according to FIGS. 9 to 11, the actuating lug 42 is positioned relative to the ramp element 43 in such a way that actuation does not occur.

If the actuating part 33 is moved against the force of the spring 45 in direction y1 (see FIGS. 12 and 13), the blocking element 44 is also displaced in direction y1. In addition, the actuating lug 42 comes into contact with the ramp element 43 and thereby loads the comfort catch 16 in direction z2. The actuating lug 42 and the ramp element 43 thereby form a movement converter which converts a force applied in direction y1 by the actuating part 33 into a force acting in direction z2 on the comfort catch 16 (see FIG. 12).

Figure 13:
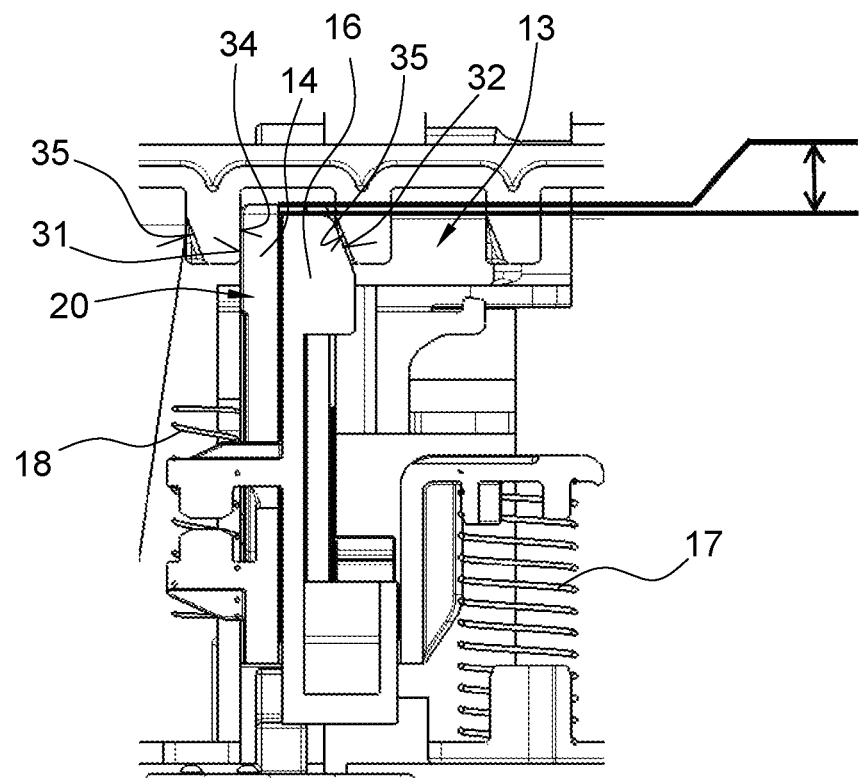
FIG. 13 is a sectional view of the catch assembly based on FIG. 10, wherein the safety catch is in the catch position and a comfort catch is in a secondary position.

The comfort catch 16 is thereby moved relative to the safety catch 14 in direction z2 by the length I, wherein the second catch surface 32 loses contact with the second holding surface 35 of the recess 13 (see FIG. 13). The stop surface 36 of the comfort catch 16 is moved into contact with the base surface 37 of the safety catch 14. The comfort catch 16 is then in the second position.

Figure 14:
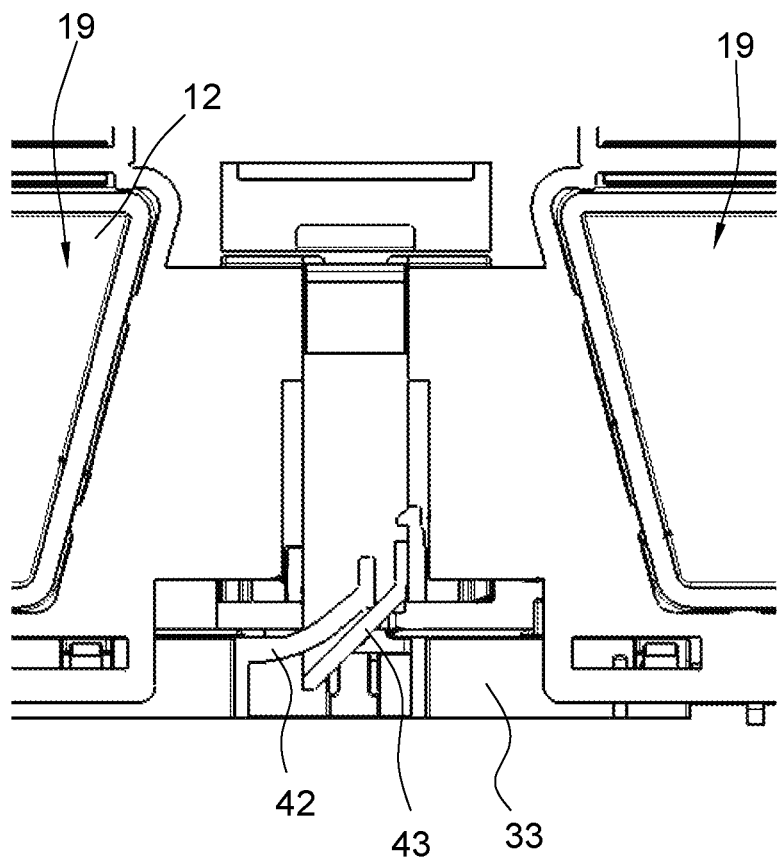
FIG. 14 is a rear view of the headrest based on FIG. 9, wherein an actuating device is arranged in an actuated position.
Figure 15:
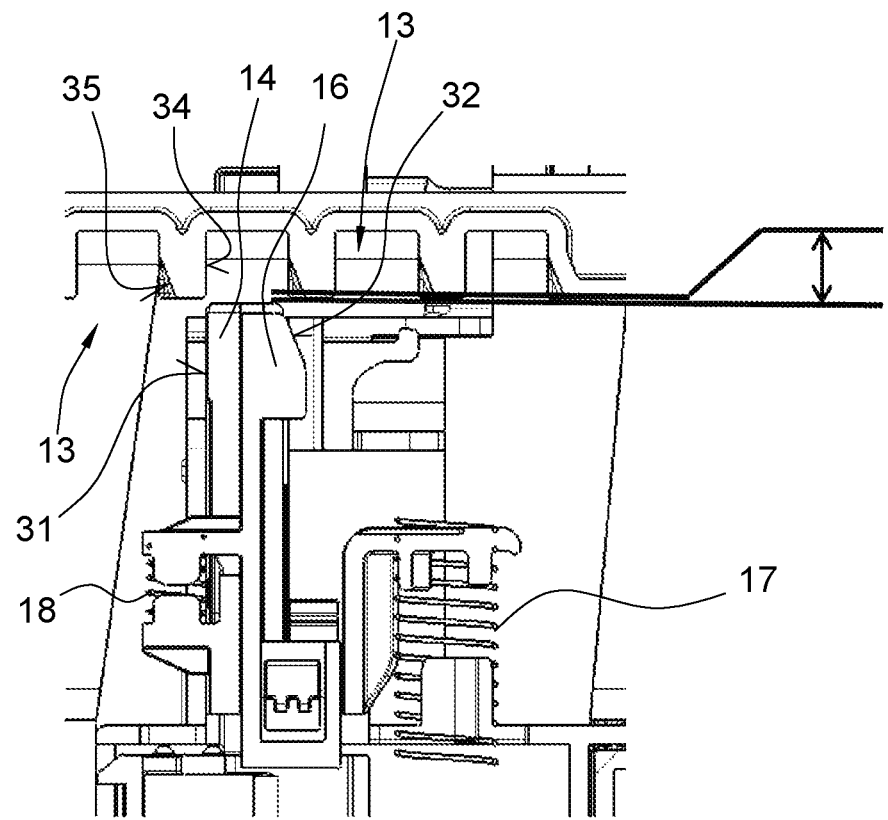
FIG. 15 is a sectional view of the catch assembly according to FIG. 14, wherein the safety catch is in the release position and the comfort catch is in the secondary position.

As the actuating part 33 moves further in direction y1 (see FIGS. 14 and 15), the safety slide 14 is carried in direction z2 by the comfort slide 16. The blocking element 44 has been displaced so far in direction y1 that it is no longer in the movement path of the safety catch 14. The catch regions 28 and 29 move out of the recess 13 completely. The catch surface 31 then also is no longer in contact with the holding surface 34.

The movable part 12 can then be moved, for example, from the first position according to FIG. 3 into the second position according to FIG. 4 or into a position located therebetween.

As soon as the actuating part 33 is relieved of load, the spring 45 moves the actuating part 33 in direction y2 into the unactuated position, wherein the actuating lug 42 is also moved relative to the ramp element 43 in direction y2. The safety slide 14 and the comfort slide initially move together in direction z1 owing to the spring force of the safety spring 17.

When the safety catch 14 has reached the catch position, the comfort catch 16, owing to the spring force of the spring 18, moves further relative to the safety catch 14 in direction z1 into the primary position, in which the second catch surface 32 is in contact with the second holding surface 35.

In the unactuated position of the actuating part 33, the blocking element 44 is again positioned relative to the safety catch 14 in such a way that a movement of the safety catch 14 in direction z2 is prevented by the blocking element 44. The blocking surface 47 is arranged in the movement path of the bottom surface 46.

The invention claimed is:

1. An equipment part for a vehicle, comprising: a base; and a part that is movable relative to the base, wherein the movable part is lockable with respect to at least one movement direction in at least two positions relative to the base by a locking device, wherein the locking device comprises at least one recess, wherein in a catch position of the locking device at least one safety catch engages into at least one recess and in a release position the safety catch is out of engagement with the recess, wherein the safety catch comprises a first catch surface that cooperates with a first holding surface of the recess, and wherein the locking device has at least one comfort catch that comprises a second catch surface that cooperates with a second holding surface of the recess, wherein the second catch surface is inclined relative to the first catch surface, wherein the locking device is configured to block the movable part in both opposite movement directions when the locking device is in the catch position, wherein the locking device includes at least one recess in one of the base and the movable part and at least one catch in the other of the base and the movable part.

2. The equipment part according to claim 1, wherein the first holding surface and/or the second holding surface extends substantially at a right angle to the movement direction of the movable part.

3. The equipment part according to claim 1, wherein the first catch surface of the safety catch is parallel to the first holding surface.

4. The equipment part according to claim 1, wherein the second holding surface is inclined relative to the first holding surface.

5. The equipment part according to claim 1, wherein the first holding surface is arranged opposite the second holding surface.

6. The equipment part according to claim 1, wherein at least one of the safety catch and the comfort catch is a slide.

7. The equipment part according to claim 1, wherein the safety catch and the comfort catch are mounted so as to be movable relative to one another.

8. The equipment part according to claim 1, wherein one of the safety catch and the comfort catch is mounted on the other of the safety catch and the comfort catch.

9. The equipment part according to claim 1, wherein one of the safety catch and the comfort catch has a first stop surface and a second stop surface, and wherein end positions of the other of the safety catch and the comfort catch are delimited by the first stop surface and by the second stop surface.

10. The equipment part according to claim 1, wherein at least one of the safety catch and the comfort catch is guided on the base.

11. The equipment part according to claim 1, wherein the safety catch is loaded by a safety spring in engagement with the first holding surface.

12. The equipment part according to claim 1, wherein the comfort catch is loaded by a comfort spring in engagement with the second holding surface or is loaded into a specific position relative to the safety catch.

13. The equipment part according to claim 12, wherein the comfort spring has one end that bears against the safety catch and another end that bears against the comfort catch.

14. The equipment part according to claim 1, wherein the safety catch and/or the comfort catch is movable between two positions by an actuating device.

* * * * *